(12) United States Patent
Kakivaya et al.

(10) Patent No.: US 7,934,118 B2
(45) Date of Patent: Apr. 26, 2011

(54) FAILURE NOTIFICATION IN RENDEZVOUS FEDERATION

(75) Inventors: Gopala Krishna Reddy Kakivaya, Sammamish, WA (US); Lu Xun, Kirkland, WA (US); Jason T. Hunter, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/430,258

(22) Filed: Apr. 27, 2009

(65) Prior Publication Data

US 2010/0107002 A1     Apr. 29, 2010

Related U.S. Application Data

(60) Provisional application No. 61/108,256, filed on Oct. 24, 2008.

(51) Int. Cl.
*G06F 11/00* (2006.01)
(52) U.S. Cl. .............................................. 714/4; 714/43
(58) Field of Classification Search .................. None
See application file for complete search history.

(56) References Cited

U.S. PATENT DOCUMENTS

| | | | |
|---|---|---|---|
| 6,798,780 B1 * | 9/2004 | Dan et al. | 370/395.21 |
| 6,920,580 B1 * | 7/2005 | Cramer et al. | 714/4 |
| 7,206,934 B2 | 4/2007 | Pabla et al. | |
| 7,333,425 B2 | 2/2008 | Huck et al. | |
| 7,362,718 B2 | 4/2008 | Kakivaya et al. | |
| 2004/0039840 A1 * | 2/2004 | Dispensa et al. | 709/242 |
| 2004/0064568 A1 | 4/2004 | Arora et al. | |
| 2004/0103179 A1 | 5/2004 | Damm et al. | |
| 2004/0215772 A1 * | 10/2004 | Dinker et al. | 709/225 |
| 2005/0262382 A1 * | 11/2005 | Bain | 714/4 |
| 2006/0053216 A1 * | 3/2006 | Deokar et al. | 709/223 |
| 2006/0090003 A1 * | 4/2006 | Kakivaya et al. | 709/238 |
| 2006/0282547 A1 * | 12/2006 | Hasha et al. | 709/251 |
| 2007/0002774 A1 * | 1/2007 | Hasha et al. | 370/258 |
| 2008/0031246 A1 * | 2/2008 | Hasha et al. | 370/390 |
| 2008/0288659 A1 * | 11/2008 | Hasha et al. | 709/250 |

OTHER PUBLICATIONS

Rowstron et al., "Pastry: Scalable, decentralized object location and routing for large-scale peer-to-peer systems", Nov. 2001.*
Ratnasamy et al., "A Scalable Content-Addressable Network", SIGCOMM'01, Aug. 27-31, 2001.*
Clark, et al. FARA: Reorganizing the Addressing Architecture. http://www.isi.edu/newarch/DOCUMENTS/FARA.FDNA03.pdf. Last accessed Nov. 11, 2008.
Pietzuch, et al. Hermes: A Distributed Event-Based Middleware Architecture. http://www.doc.ic.ac.uk/~peter/manager/doc/prp-debs2002-hermes.pdf. Last accessed Nov. 11, 2008.
Mei, et al. Sensor Replacement using Mobile Robots. http://cobweb.ecn.purdue.edu/~dsnl/smdas/COMCOM07-1.pdf. Last accessed Nov. 11, 2008.

* cited by examiner

*Primary Examiner* — Gabriel L Chu
(74) *Attorney, Agent, or Firm* — Turocy & Watson, LLP (57) ABSTRACT

Systems and methods that supply a global knowledge on what nodes are available in the system, via employing routing tokens that are analyzed by a centralized management component to infer status for the nodes. When nodes fail, the routing tokens associated therewith are acquired by neighboring nodes, and the global knowledge updated. Moreover, upon inferring a failed or down status for a node, a challenge can be sent to a node reporting such failure to verify actual failure(s).

20 Claims, 11 Drawing Sheets

FAILURE NOTIFICATION IN RENDEZVOUS FEDERATION

CROSS-REFERENCE TO RELATED APPLICATIONS

This application claims the benefit of U.S. Provisional Application No. 61/108,256 filed on 24 Oct. 2008 entitled "FAILURE NOTIFICATION IN RENDEZVOUS FEDERATION", the entirety of this application is hereby incorporated by reference. This non-provisional application further relates to U.S. patent application Ser. No. 12/038,363 filed on 27 Feb. 2008, entitled "NEIGHBORHOOD MAINTENANCE IN THE FEDERATION" and U.S. patent application Ser. No. 12/020,074 filed on 25 Jan. 2008, entitled "ROUTING TOKEN TRANSFER & RECOVERY PROTOCOL IN RENDEZOUS FEDERATION"; all of the aforementioned patent applications are incorporated herein by reference in their entireties.

BACKGROUND

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

As the amount of available electronic data grows, it becomes more important to store such data in a manageable manner that facilitates user friendly and quick data searches and retrieval. Today, a common approach is to store electronic data in one or more databases. A typical database can be referred to as an organized collection of information with data structured such that a computer program can quickly search and select desired pieces of data, for example. Moreover, in such environments a federation refers to a group of organizations or service providers that have built trust among each other and enable sharing of user identity information amongst themselves.

With the advent of distributed computing models such as web services, there are increased interdependencies among entities such as a Service Providers (SP's.) Accordingly, a current trend is to focus on inter-organization and inter-dependent management of identity information rather than identity management solutions for internal use. Such can be referred to as federated identity management. In general, federated identity is a distributed computing construct that recognizes that individuals move between corporate boundaries at an increasingly frequent rate. Practical applications of federated identities are represented by large multinational companies that are required to manage several heterogeneous systems at the same time.

In such distributed systems, various challenges exist for proper management and configuration/reconfiguration of nodes. For example, individual nodes can fail randomly, which can cause data loss when suitable contingencies are not put into place. Likewise, replicated data is often required to be moved around the system, which can further create reliability issues and consistency problems.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation supplies global knowledge for status of available nodes in a federation, via employing routing tokens that are analyzed by a centralized management component, to infer availability of such nodes. Additionally, upon inferring a failed or down status for a node, a challenge can be sent to a reporting node, which reports such failure to the centralized management component, for verifying actual failure(s). The routing token represents and/or enforces system conditions, wherein if a node A has a token within range from X to Y, there can be no other node in the federation whose id falls into such range ([X, Y]); hence only the node A is considered within such range. Likewise, when a node B is alive, it must own a token that contains the node id of B itself. When such node B fails, a token associated therewith will be recovered by its neighbors—e.g., nodes A and C. Subsequently, either A or C's new token can cover B's node id. Accordingly, by analyzing tokens associated with node A and node C, one can infer whether node B has failed—wherein any of the nodes A or C can report such failure of node B to the centralized management component. Such an approach can further prove reliable against cascading failures.

According to a further aspect, C's token covers B's id, and C can also fail (in addition to node B) before C contacted the centralized management component. The subject innovation addresses such aspect, when C's neighbor, such as A and D, additionally recover C's token. Hence, after such token recovery, the id for both nodes B and node C will be covered by the token from either A or D—wherein one can still reliably indicate that both node B and node C have failed (e.g., are down), by observing/analyzing the tokens for node A and node D.

In another aspect, when the centralized management component infers that a node X seems to be down because a reporting node A claims to own a token that covers the id of node X, the centralized management component can send back a challenge to node A, to check whether A still has a token that covers X. If a response to such request is affirmative (e.g., yes), it can be concluded that node X is indeed down. Otherwise, node A must have come up after node X sends out the notification and therefore the centralized management component cannot safely mark it as down.

The nodes can be part of a Federation, which represents a collection of domains that have established trust. The level of trust can vary, but typically includes authentication and authorization. In general, a federation of the subject innovation can include a number of organizations that have established trust for shared access to a set of resources. At no time two nodes will ever claim ownership of the same token, and a message destined to the given id at any moment is accepted only by that node—(e.g., a safety property). Moreover, when a message is repeatedly sent to a target id, it is eventually accepted, (e.g., a liveness property.)

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
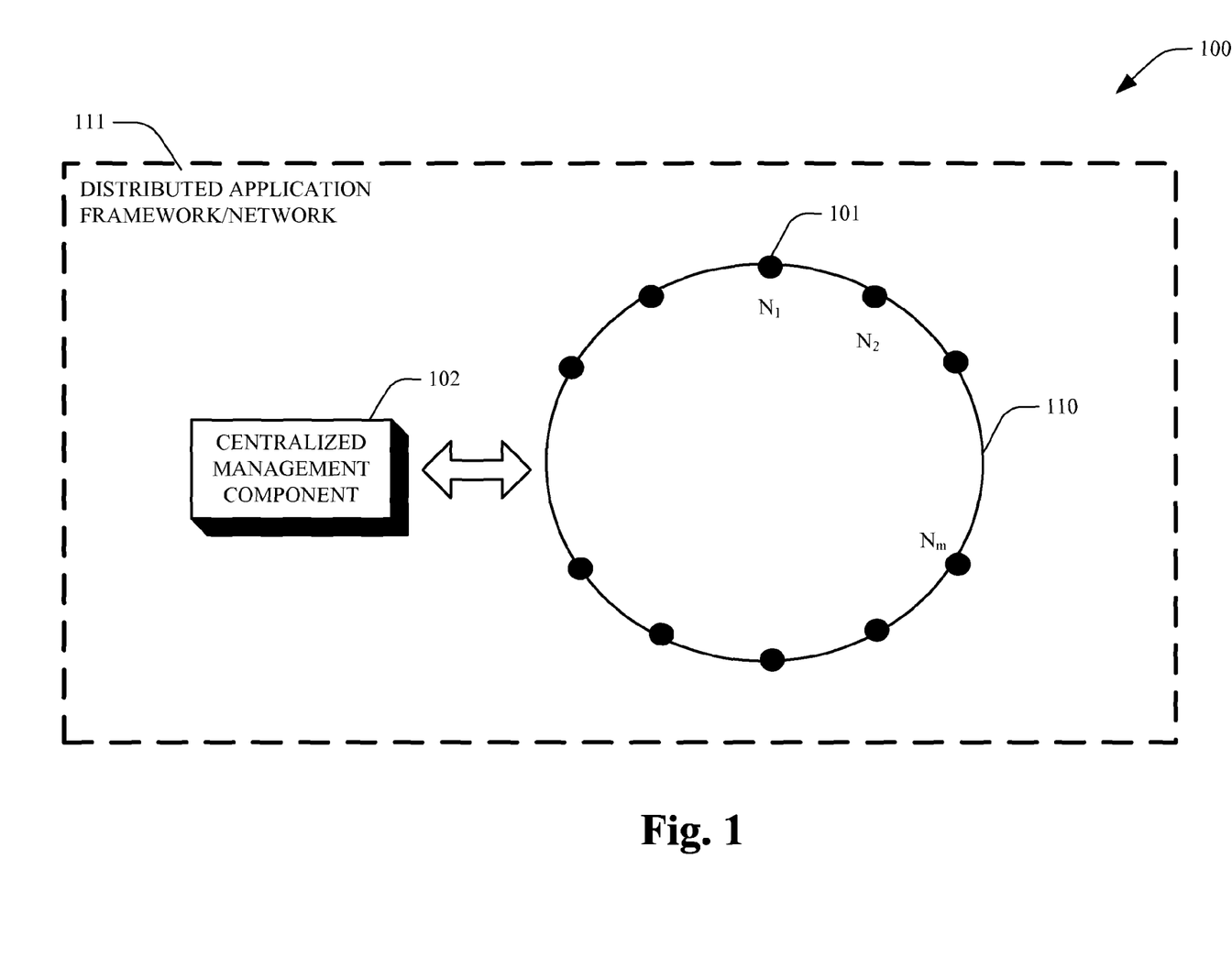
FIG. 1 illustrates a block diagram of a system with a centralized management component that is associated with a plurality of nodes for a federation in accordance with an aspect of the subject innovation.

FIG. 1 illustrates a block diagram of a system 100 that implements a centralized management component 102 in conjunction with a plurality of nodes as part of a ring 110 in accordance with an aspect of the subject innovation. In general, when the first node $N_1$ 101 comes up in a ring 110, it will create a token that covers the entire number space, and can be referred to as the initial token creation. Subsequently, a token can ideally only be transferred among the nodes ($N_1$ to $N_m$ where m is an integer), so that typically, no two nodes can have overlapping tokens at any time (except for token recovery, as described in detail infra). For example, in a simplest form an administrator can explicitly indicate whether a node is first or not.

After the initial creation of the token, such token typically needs to be split whenever a new node joins in the ring and requires a merger when an existing node leaves the ring and therefore relinquishes its token to some other node(s). In general, the ring 110 is associated with a federation that can consist of set of nodes that cooperate among themselves to form a dynamic and scalable network, wherein information can be systematically and efficiently disseminated and located.

Moreover, the nodes participating in a federation can be represented as a sorted list using a binary relation that is reflexive, anti-symmetric, transitive, total, and defined over the domain of node identities. For example, both ends of the sorted list can be joined, thereby forming a ring 110. Such provides for each node in the list to view itself as being at the middle of the sorted list.

In a related aspect, the list can be doubly linked such that a node can traverse the list in either direction. Moreover, a one-to-one mapping function can be defined from the value domain of the node identities to the nodes themselves. Such mapping function accounts for the sparseness of the nodes in the value domain when the mapping is not tight.

As such, every node participating in the federation is assigned a natural number that is between 0 and some appropriately chosen upper bound, inclusive, and that that range does not have to be consecutive—e.g., there can exist gaps between numbers assigned to nodes. Such number assigned to a node acts as its identity in the ring. The mapping function accounts for gaps in the number space by mapping a number being positioned in between two node identities to the node having an identity that is numerically closest to the number. Accordingly, by assigning each node a uniformly distributed number, it can be ensured that all segments of the ring are uniformly populated. Moreover and as described in detail infra, nodes that indicate the successor, predecessor, and neighborhood computations can be performed efficiently using modulo arithmetic.

As described in detail infra, routing consistency can be achieved via assignment and ownership of tokens. Typically, a node can accept a message only when it has an ownership token on the id to which the message is destined. As explained above, a token contains a consecutive range of IDs and every token has an owner. A token in transit is considered not to exist until it is accepted by a node. Moreover, the range of two tokens must in general be disjoint—wherein all token ranges are disjoint, and a token can be split into two adjacent tokens. Also, two or more adjacent tokens can be merged into a single token, wherein a node does not accept a message without a corresponding token.

Additionally, a node must typically own a token that includes at least its own ID. A node owning a token is referred to as being in the routing stage and can also be referred to as a routing node. A routing node owns only a single token, or, a single range of IDs, for example. Eventually, the token for an ID can be owned by a routing node that is closest to that ID (e.g., the liveness property). Moreover, token transfer can be synchronized with the transfer of data that is stored at any ID in the range of the token. Accordingly, token transfer can typically occur only after data transfer is completed. In general, a node that owns a routing token can be referred to as a routing node.

Figure 2:
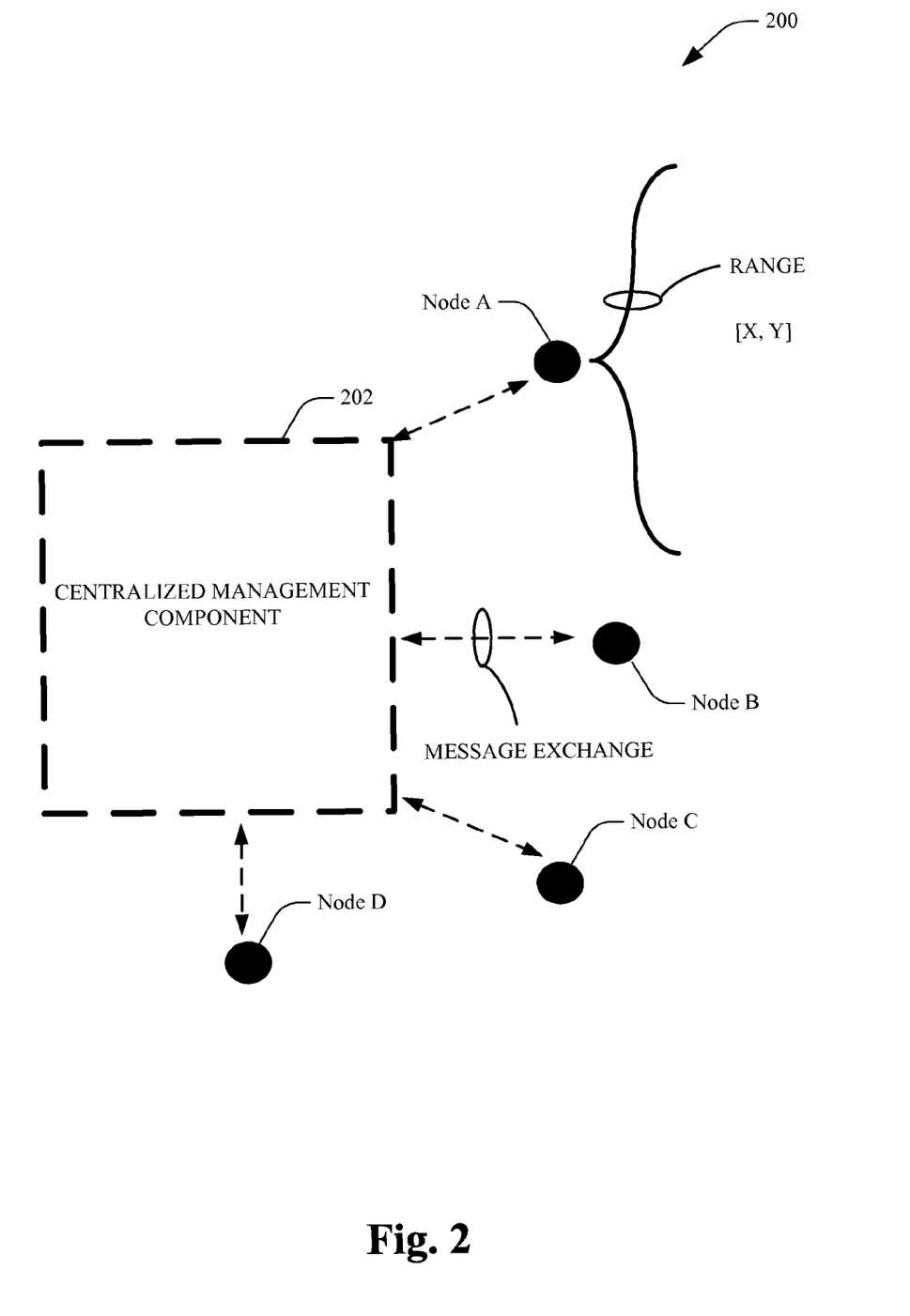
FIG. 2 illustrates an exemplary node failure and reporting to the centralized management component according to a particular aspect of the subject innovation.

FIG. 2 illustrates a particular interaction of four nodes A, B, C, and D with a centralized management component 202—via employing routing tokens according to an exemplary aspect of the subject innovation. Such routing token has an advantageous property that if a node A has a token with range from X to Y (X, Y being any suitable number), there can be no other node in the federation whose id falls into [X, Y], except the node A itself. As such, when a node B is alive, it must own a token that contains the node id of B itself. When such node B fails, the token associated therewith will be recovered by its neighbors, such as nodes A and C, for example. Subsequently, the new token associated with either node A or node C can cover the id associated with node B. Hence, by analyzing/observing the tokens associated with node A and node C, one can infer whether node B has failed. Such an approach can further prove reliable against cascading failures.

According to a further aspect, the token of node C covers the id of node B, and node C can also fail (in addition to node B) before node C contacted the centralized management component 202. The subject innovation addresses such aspect, because node C's neighbor, such as node A and node D, can recover node C's token as well. Hence, after the token recovery, both B and C's node id will be covered by the token from either node A or node D, and therefore one can still reliably indicate that both node B and node C have failed and are down, by observing/analyzing tokens associated with node A and node D.

Figure 3:
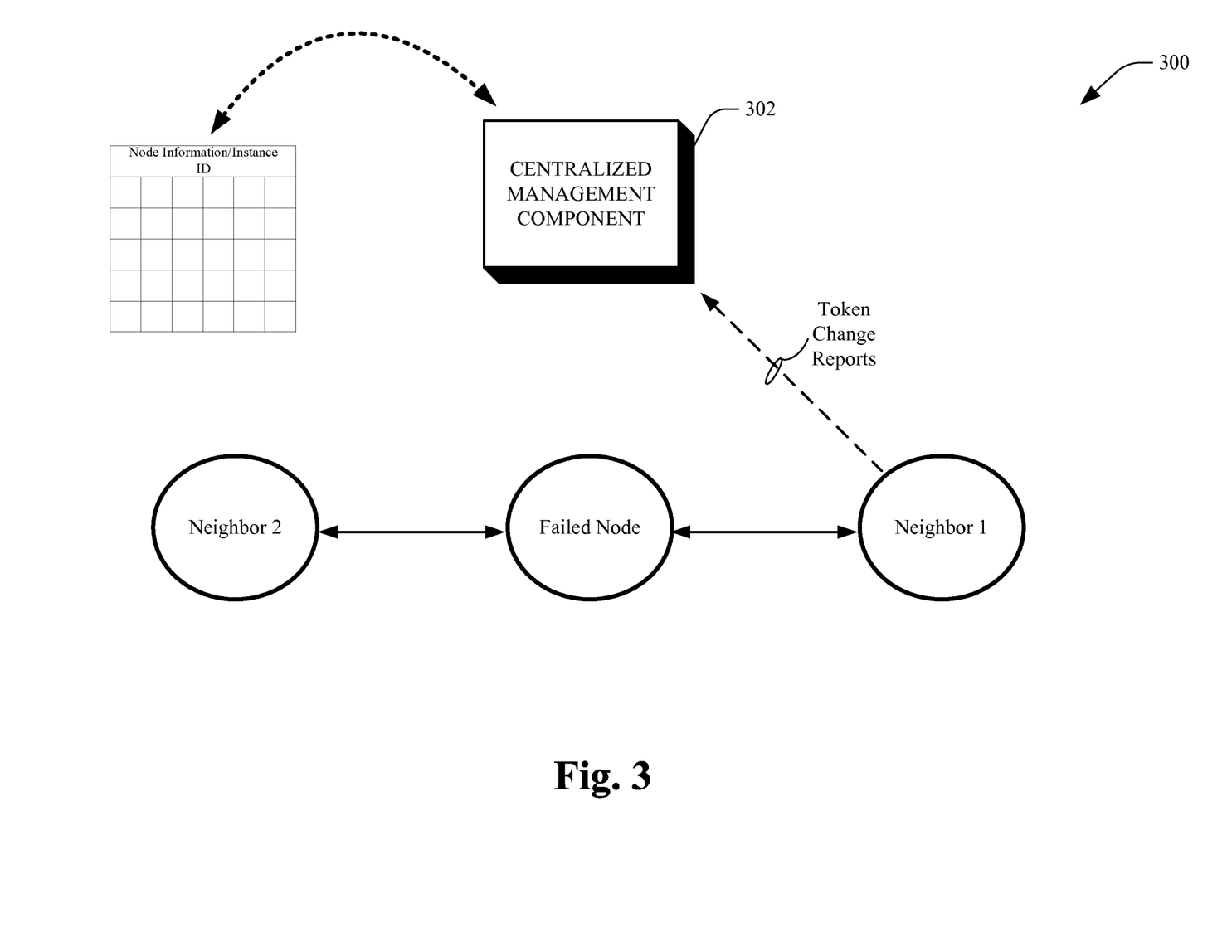
FIG. 3 illustrates a particular aspect for node failure and token analysis by a centralized management component according to a particular aspect of the subject innovation.

FIG. 3 illustrates a related aspect of analyzing tokens by a centralized management component 302 according to an aspect of the subject innovation. As explained earlier, every node has a unique and stable node id, and an instance id that increases every time the node starts up (e.g. a timestamp being employed). Such enables the centralized management component 302 to identify every node and differentiate between difference instances of the same node. It is to be appreciated that if one knows the existence of a node with instance id X, then one can infer that the same node with instance id Y, where Y<X, must have failed or gone down, regardless of whether instance X is up or down.

Moreover, the centralized management component 302 maintains a storage medium/representation and/or table for all the nodes it knows about, wherein the actual data structure and storage mechanism can implement various configurations) for example. The information that needs to be maintained for each node includes the latest instance id of this node and whether this instance is known to be up or down.

Such storage or table further represents the global knowledge that the central management component maintains. It is noted that even though such table may not always contain the most up-to-date information—nonetheless, eventually such table can become up to date and contain the most up-to-date information, when there are no more changes (node going up or down) in the federation for a sufficiently long time.

Figure 4:
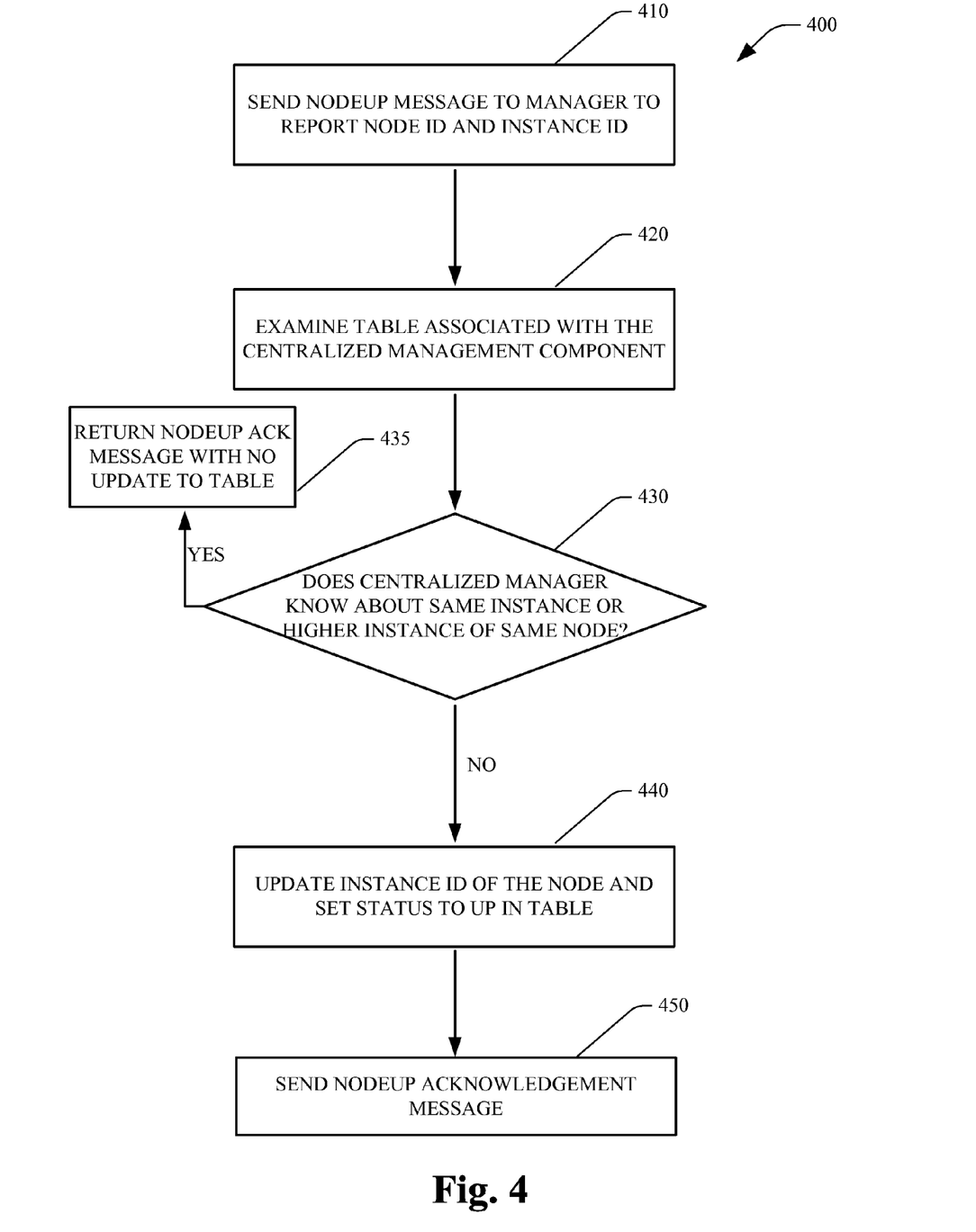
FIG. 4 illustrates a methodology for a node joining a federation ring in accordance with an aspect of the subject innovation.

FIG. 4 illustrates a methodology for a node joining a federation ring in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially, and at 410 when a node joins the ring, it sends a NodeUp message to the central management component and reports both its node id and instance id.

Upon receiving such message by the centralized management component, a table associated therewith is examined at 420 to verify whether the centralized management component already knows about the same instance or a higher instance of the same node. If yes, no update is necessary to the table and the centralized management component returns a NodeUpACK message to the node at 435. Otherwise, the centralized management component updates the instance id of the node and set its status to up in its table. At 450, after the update is completed, the centralized management component also sends back a NodeUpACK message to the node. On the other hand, the joining node should keep sending the NodeUp message to the centralized management component (e.g., periodically) until a NodeUpACK message is received. As such, a status report can be employed to determine status of the nodes in the federation.

Figure 5:
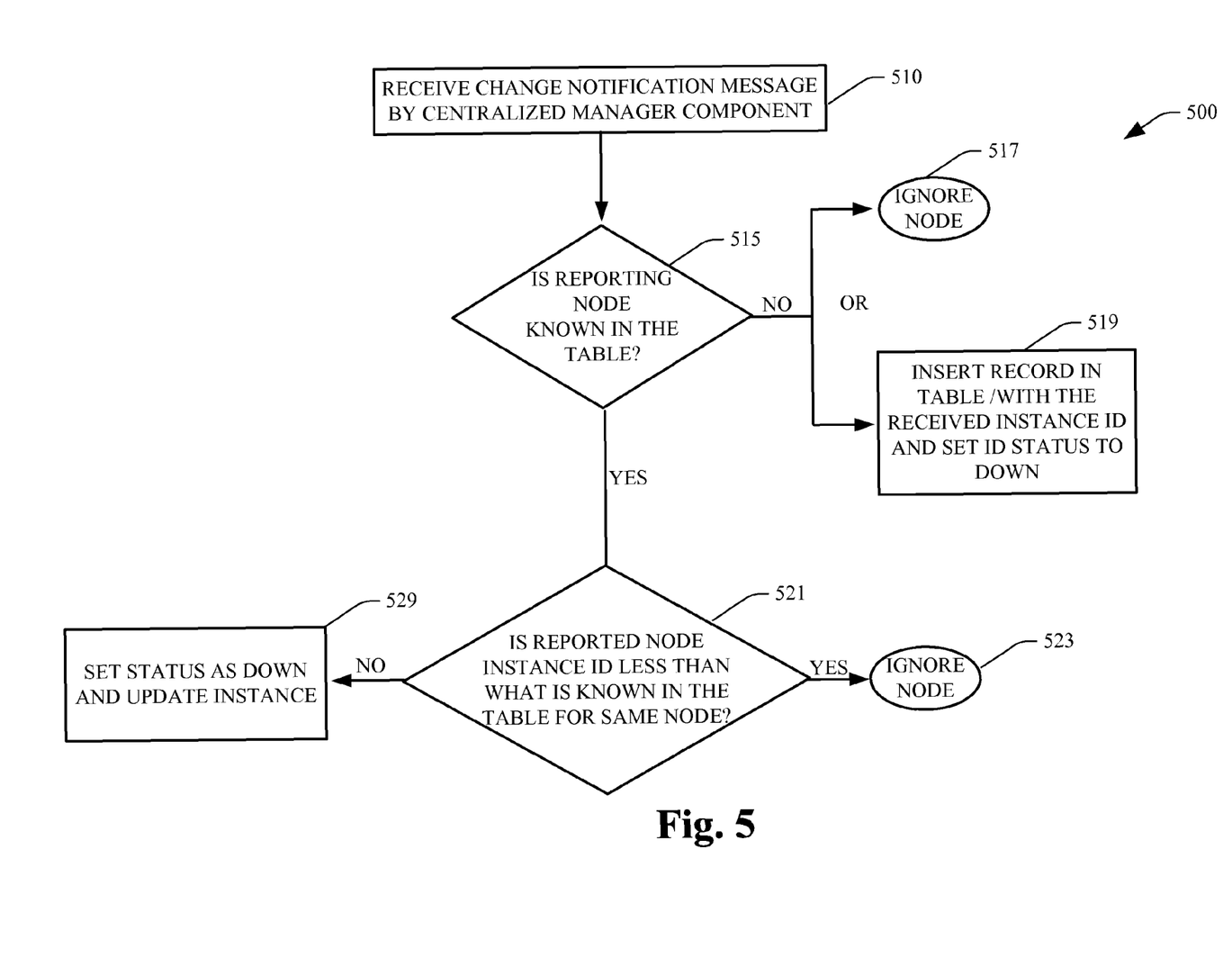
FIG. 5 illustrates a methodology of updating a table based on message exchange according to a further aspect.

FIG. 5 illustrates a related methodology 500 for updating a table upon receiving a ChangeNotification message according to an aspect of the subject innovation. In general, when a node's routing token range is increased, it sends a ChangeNotification message, which is received by the centralized manager component, and further contains a current routing token range associated therewith.

Typically, such message can also include information about all the nodes (with the instance id information) that are known to be down in the reporting node's neighborhood. When the centralized management component receives a ChangeNotification message at 510, it also first checks whether there is any information about nodes known to be down by the reporting node, by verifying whether reporting node is known in the table at 515. If not, and the reporting node is not known in the table, one can either ignore the node at 517, or insert a record in the table at 519 with the received instance id and set its status to down. Otherwise, the methodology 500 proceeds to verification act 521, wherein if the reported node instance id is less than what is known in the table for the same node, such node can be ignored at 523. Similarly, if the reported node instance id is the same as or higher than what is known in the table, the status can be set as down and update instance id at 529.

Figure 6:
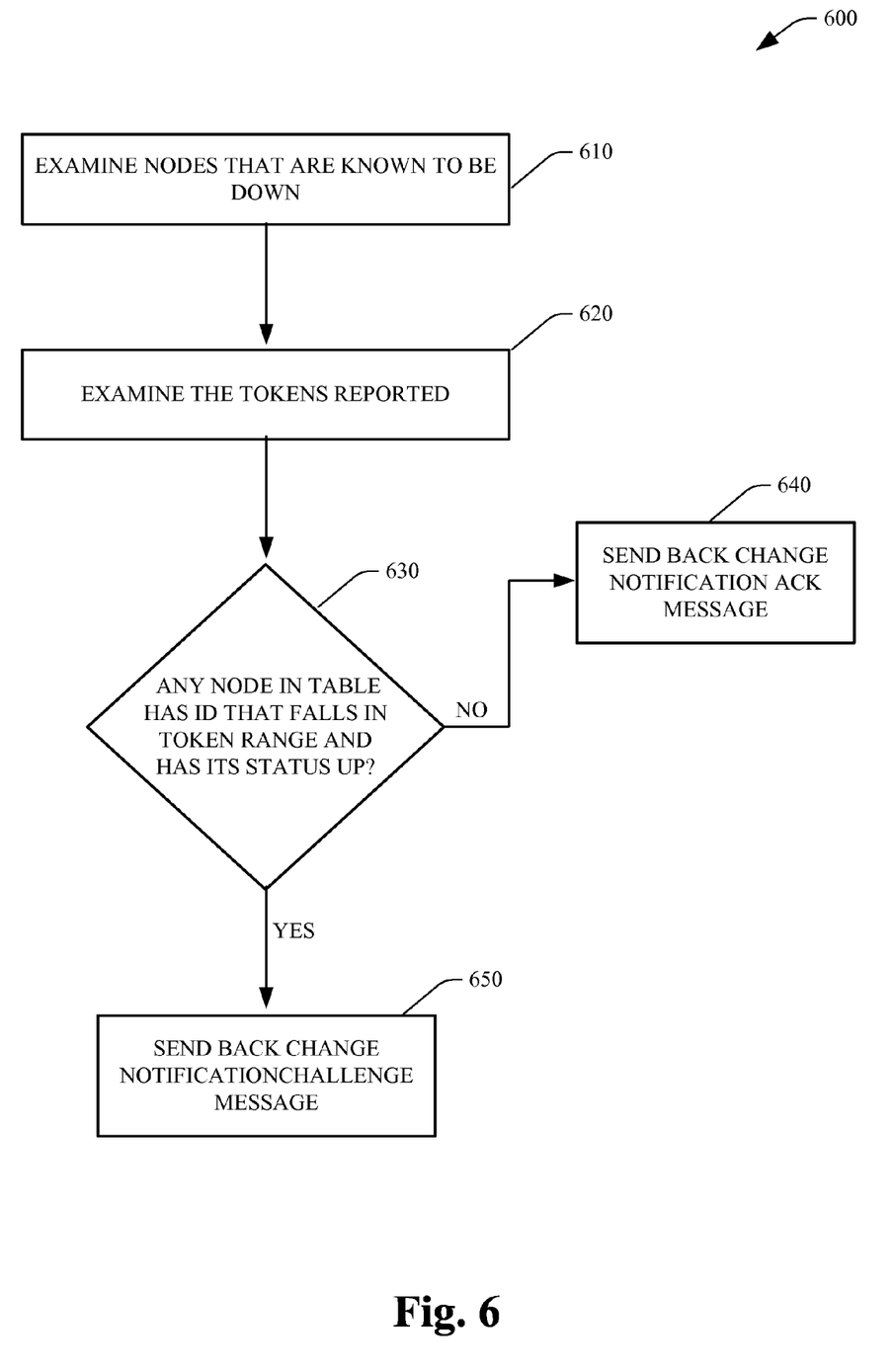
FIG. 6 illustrates a related methodology of examining tokens according to an aspect of the subject innovation.

FIG. 6 illustrates a methodology 600 of examining tokens according to a particular aspect of the subject innovation. Initially and after examining the nodes that are known to be down at 610, the centralized management component can further examine the token reported at 620 and verify at 630 whether there is any node in the table whose id falls into the token range and having its status up. If no such node exists, the centralized management component can send back a ChangeNotificationAck message at 640. Otherwise, the centralized management component can send back a ChangeNotificationChallenge message at 650, which can contain all such nodes—since the central management component cannot absolutely conclude whether such nodes are actually down or not.

Figure 7:
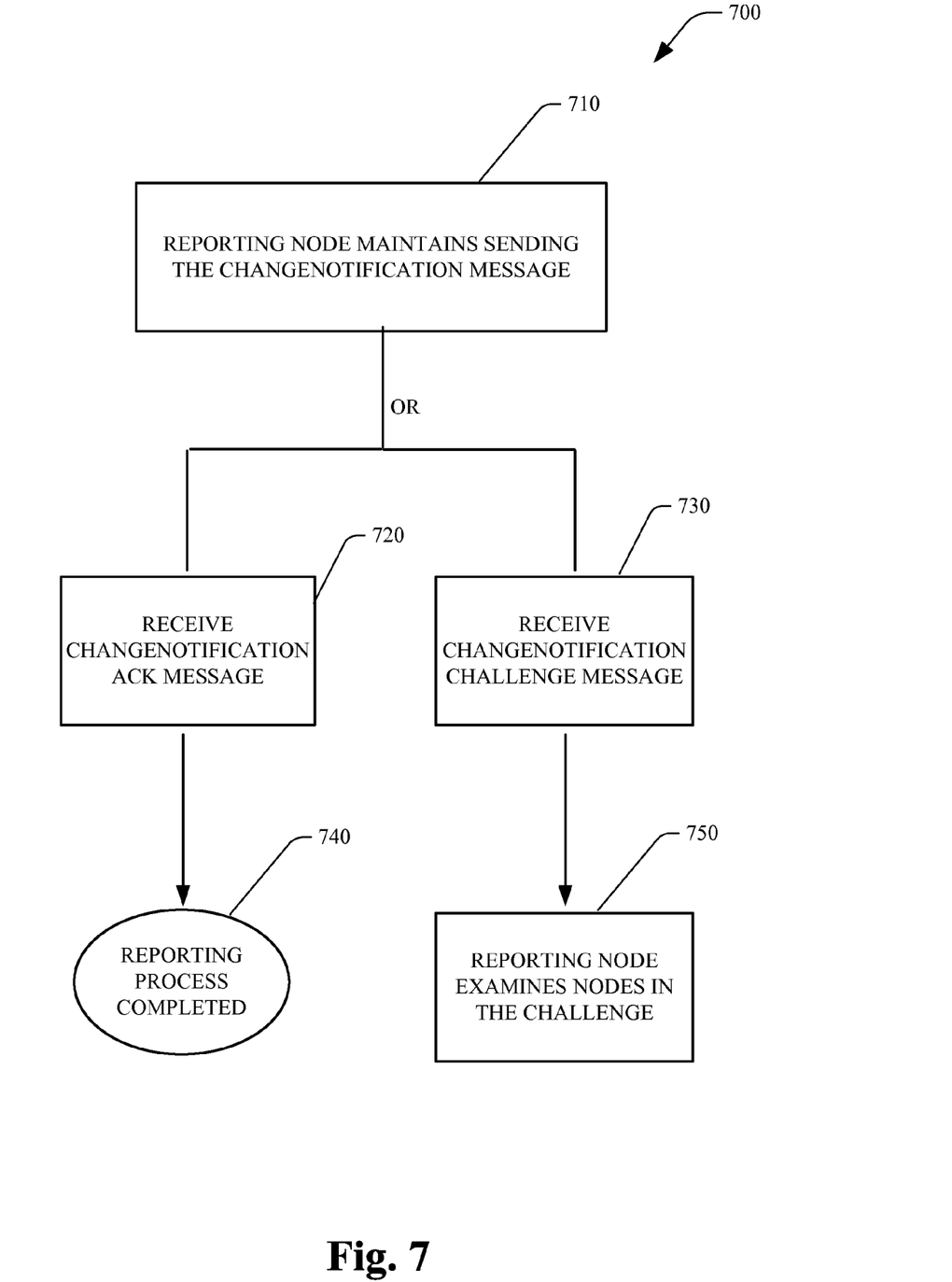
FIG. 7 illustrates a related methodology of interaction of a reporting node with the centralized management component according to an exemplary aspect.

Likewise, FIG. 7 illustrates a related methodology 700 for interaction between a reporting node and the centralized management component according to a further aspect. At 710 the reporting node maintains sending the ChangeNotification message to the central management component, until either a ChangeNotificationAck message or a ChangeNotificationChallenge message is received at 720. If the ChangeNotificationAck message is received, the reporting process can be considered as completed. Instead, and if the ChangeNotificationChallenge message is received, the reporting node examines every node in the challenge and check whether it is in the range of its current token, or ones known to be down. If there is any node that satisfies either of such conditions, the reporting node sends another ChangeNotification message with such nodes marked as down, so that the central management component can now update its table safely.

Moreover, as long as there is one node in the federation, it can be guaranteed that the central management component will eventually obtain the most up-to-date view of what nodes are up in the federation. It is to be appreciated that if the entire federation is down, the guarantee is no longer valid. However, in such situations typically the guarantee is no longer relevant since there is no activity in the federation.

Figure 8:
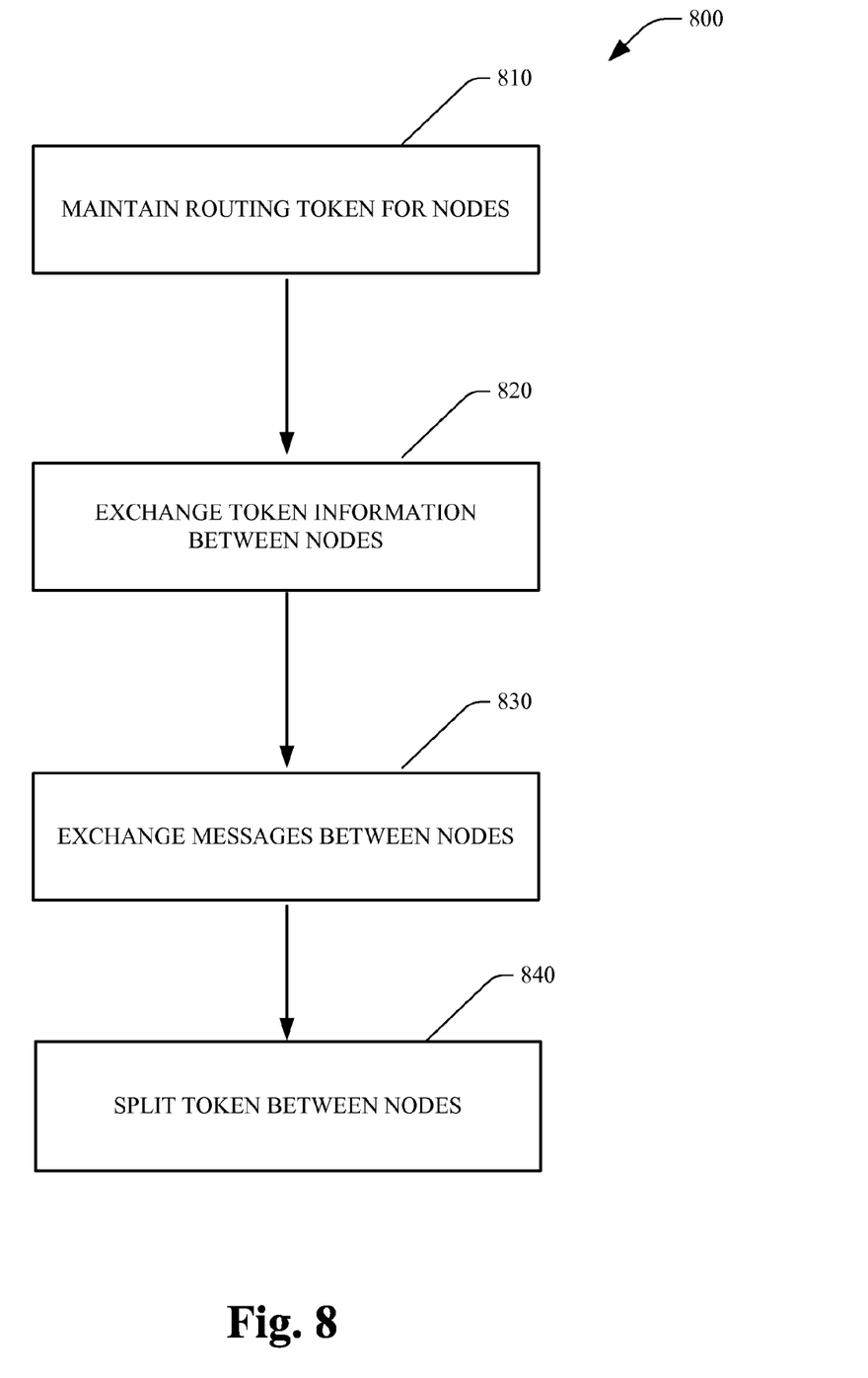
FIG. 8 illustrates a related methodology of assigning ownership of tasks and nodes in accordance with an aspect of the subject innovation.

FIG. 8 illustrates a related methodology 800 of assigning ownership of tasks and nodes in accordance with an aspect of the subject innovation. Initially and at 810, every node maintains a routing token that contains the information such as: token range, token version and recovery. For the first node in the ring, an initial token will be created with a token range of the entire node ID number space and a token version of 1. For every other node, when such node attempts to join the ring it will initialize its token range to be empty and its token version to be 0. At 820 tokens can be exchanged between nodes, wherein token can be part of the liveness headers that are exchanged between nodes when they send messages. Subsequently and at 830, a node can therefore learn about the other nodes' most recent token. It determines the freshness of such information using token version. Accordingly, whenever a routing node X finds another ready node Y that is a better owner for a sub range of its current token, it should split its current range and transfer the sub range to Y in a TOKEN-TRANSFER message. Likewise, whenever a node Y receives a token in a TOKENTRANSFER message, it can reject the token in a TOKENREJECT message (with the rejected token) if any of the following is true:

Y currently does not own a token and the token transferred to it does not contain Y's node ID.

Y currently owns a token and the token transferred to it is not adjacent to its current token.

Moreover, if Y decides not to reject the token transferred to it from node X, it performs the following to accept the token:

Merge the token range in the transferred token to its current token range.

Increase its token version by 1.

Send a TOKENACCEPTED message back to X with its current token so that X can learn about Y's new token.

Furthermore, when node X receives TOKENREJECT message from Y, it can treat the message as if it was a TOKENTRANSFER message and try to accept the rejected token. However, if it can not do so it will not send another TOKENREJECT message to Y. The transferred token is effectively lost in this situation and will have to be recovered.

Likewise, when a node leaves the ring, it can split its token into two ranges and transfer them to its immediate neighbors on each side. It can either do so by using the TOKENTRANSFER message or more efficiently achieve the same effect by embedding the token in the DEPART message. The receiving node should treat the token in the DEPART message the same way it treats the token in TOKENTRANSFER message without sending TOKENREJECT message in the reject scenario since the departing node will not reclaim the token anyway.

A node can only accept a routed message if it owns the token for the destination of the routed message. If it does not own the token and can not find any closer routing node, it should hold the message until there is one or it owns the token. Such provides for splitting the node at 840.

From the above methodology the following features can be concluded in that, 1) no two nodes will ever own overlapping tokens, which implies routing consistency, and 2) a routing node must own the token that contains its own ID and every routing token is contiguous.

Figure 9:
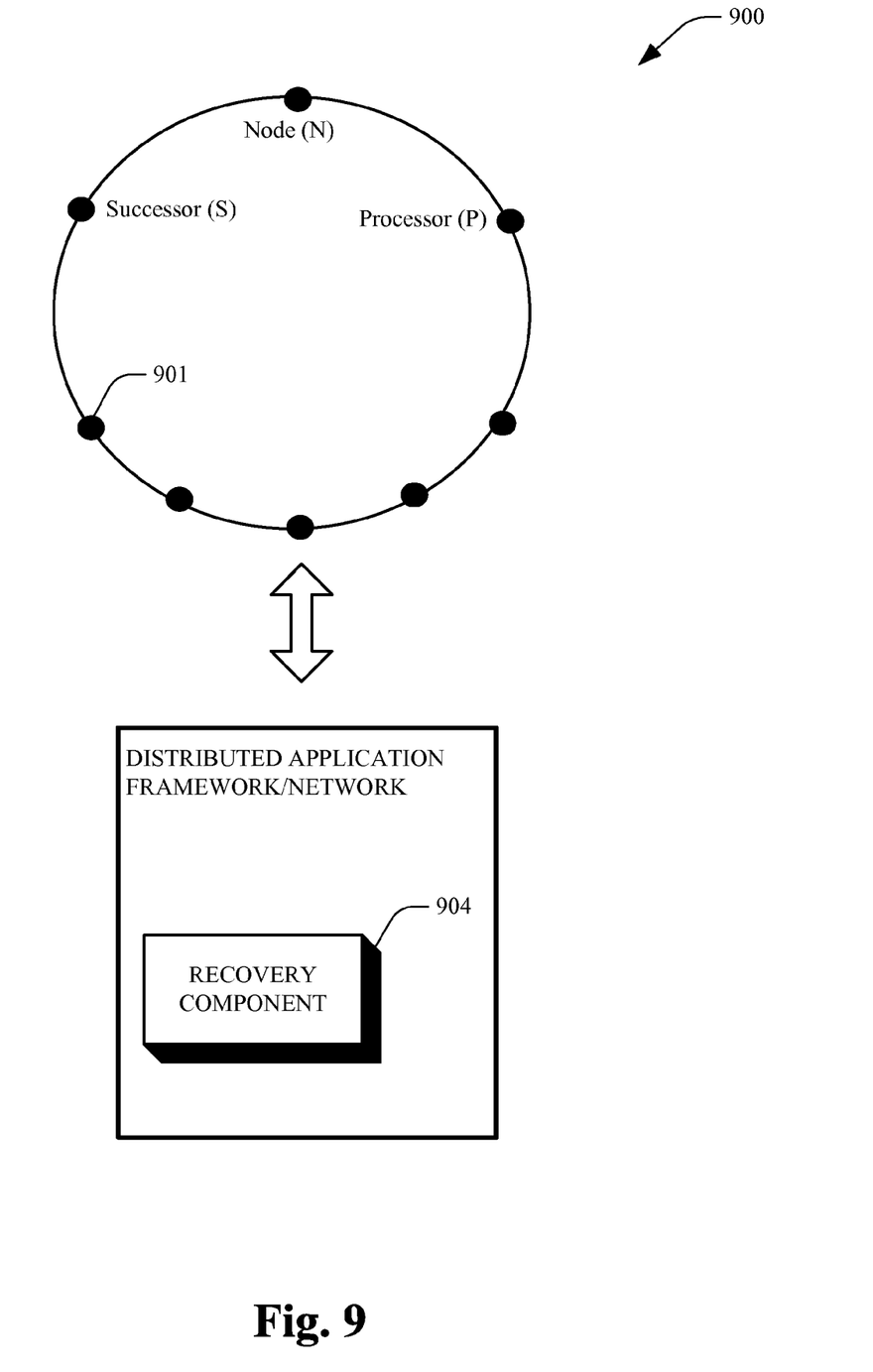
FIG. 9 illustrates a recovery component as part of a distribute application framework according to a further aspect.

FIG. 9 illustrates a system 900 of distributed application framework that implements a recovery component 904 for recovery of a token in accordance with an additional aspect of the subject innovation. The recovery component 904 can initiate the recovery protocol by a routing node. A probe message can be sent hop by hop until it reaches another routing node, which can then echo the probe message back hop by hop again until it reaches the originator. Moreover, every node on the path back can increment its recovery version to prevent itself from accepting a token that is transferred before it obtains the echo.

Under such system a node N claims ownership of the id range between its successor S and predecessor P nodes. The ownership range can be determined to be (N−(N−P)/2, N+(S−N)/2] using modulo arithmetic. Such can indicate that P, N, and S nodes have to be in agreement to guarantee only one node accepts the message sent to a target id, wherein such agreement implies ring consistency. It is to be appreciated that ring consistency alone is not sufficient to satisfy the safety property—e.g., since partitioned rings can be individually consistent, and yet violate the safety property. Various aspects of the subject innovation typically prevents ring partitions from developing from the very beginning.

Every node 901 maintains a sequence number for its token operations. The sequence number can be initialized to "0" and is increment for every token operation. The token operations are token creation, token splitting, token merger, and token recovery. All token transfer messages specify the target token sequence number at which the transferred token can be accepted by the receiving node. A receiving node cannot accept a transferred token if the specified target sequence number does not match its current token sequence number. For example, an initial seed node in a ring creates a valid token for the entire ID space and automatically becomes a routing node. Moreover, any other joining node attempts to acquire its token from an existing closest routing node as it owns the ID for the joining node. The joining node locates the closest node by routing a token request message to its own ID. When a routing node receives a token request from a non-routing node with an ID of x (x being am integer), it splits its valid token into two using the midpoint of its own ID and x as the partition point and transfers the token containing x to the joining node while retaining the other token.

Whenever a routing node finds a new successor or predecessor routing node with an ID of x, it checks to verify if its token contains ID space that is closer to the new node. If so, it splits its token into two using the midpoint of its own ID and x as the partition point and transfers the token containing x to the new node while retaining the other token. Every routing node can periodically talk to its immediate neighbor nodes so that it has infinite chances to perform such act.

In addition, when a routing node desires to leave the ring, it breaks its token into two parts using the midpoint of the predecessor and successor IDs as the partition point and transfers the two tokens to the predecessor and successor nodes respectively. Moreover, a node can accept an incoming token if it does not own a token and the incoming token range contains its own ID or its token is adjacent to the incoming one. If it cannot accept the token, it should reject it and, if possible, suggest a node that is known to be adjacent to the incoming token range. A routing node that has successfully obtained its token from both its successor and predecessor nodes is hence forth called an operating node. It is appreciated that an operating node is also a routing node and it remains an operating node until it reboots.

As used in this application, the terms "component", "system", are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 10:
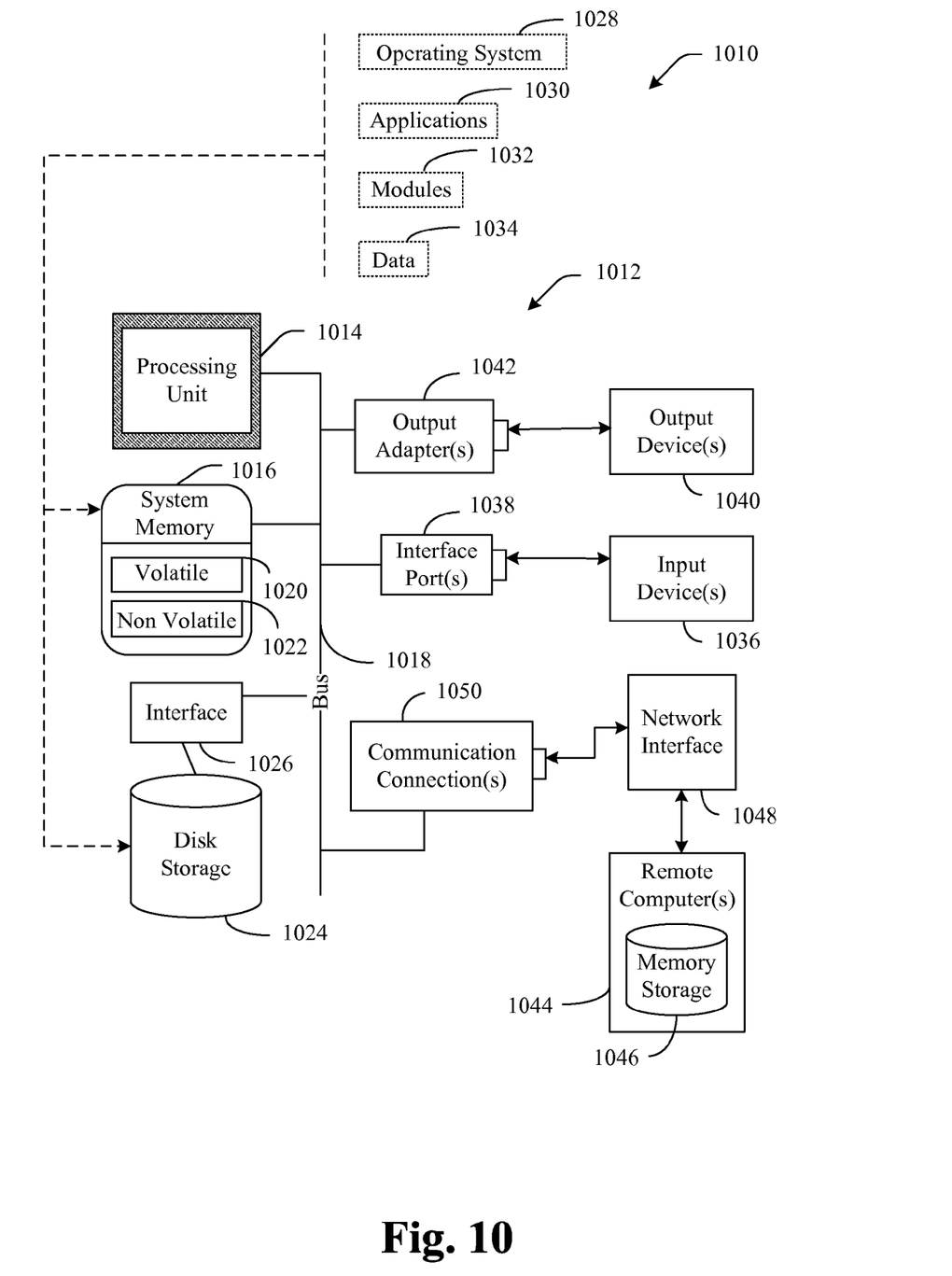
FIG. 10 illustrates an exemplary environment for implementing various aspects of the subject innovation.
Figure 11:
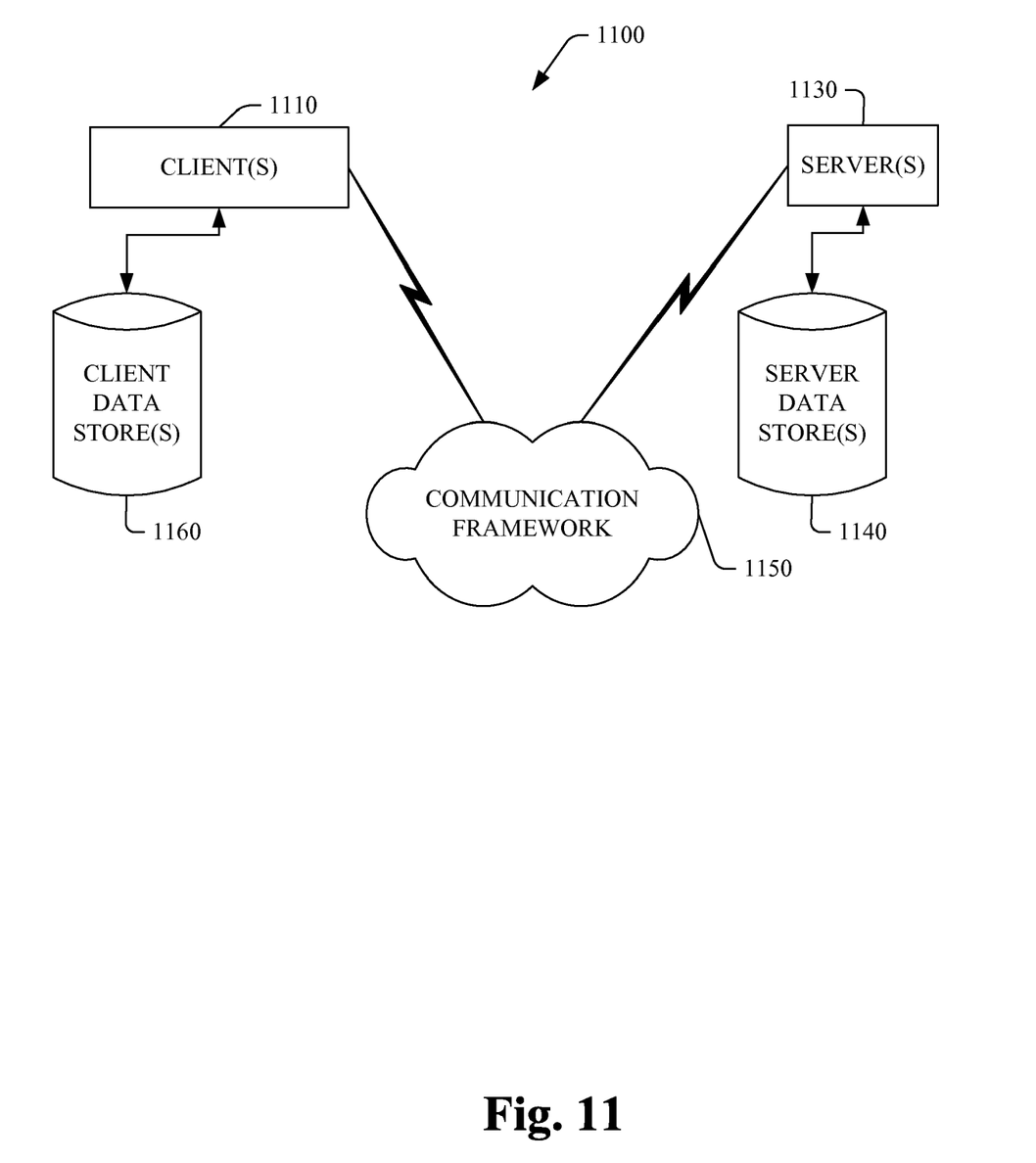
FIG. 11 is a schematic block diagram of a further computing environment according to an aspect of the subject innovation.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types.

Moreover, those skilled in the art will appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 10, an exemplary environment 1010 for implementing various aspects of the subject innovation is described that includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. For example, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates a disk storage 1024, wherein such disk storage 1024 includes, but is not limited to, devices like a magnetic disk drive, floppy disk drive, tape drive, Jaz drive, Zip drive, LS-60 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 that can be employed for implementing nodes as part of a federation, in accordance with an aspect of the subject innovation. The system 1100 includes one or more client(s) 1110. The client(s) 1110 can be hardware and/or software (e.g., threads, processes, computing devices).

The system 1100 also includes one or more server(s) 1130. The server(s) 1130 can also be hardware and/or software (e.g., threads, processes, computing devices). The servers 1130 can house threads to perform transformations by employing the components described herein, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system comprising:
    a collection of nodes of a network, the collection of nodes configured to participate in a federation and exchange tokens containing ranges of node identification; and
    a centralized management component configured to
        based on the tokens, maintain information regarding a status of the participating nodes,
        analyze the information to infer a failure of at least one node of the collection of nodes, based on a change in a range of node identification information in a token received from another node of the collection of nodes, and
        send a challenge message to the another node requesting information regarding a neighboring node in a range of identification information of the another node, to verify the failure.

2. The computer-implemented system of claim 1, wherein the centralized management component is configured to differentiate between different instances of a same node.

3. The computer-implemented system of claim 1, further comprising a mapping function configured to map node identities to nodes of the collection of nodes.

4. The computer-implemented system of claim 3, the mapping function further comprising a one-to-one mapping function definable from a value domain of node identities to the collection of nodes.

5. The computer-implemented system of claim 4, wherein the mapping function is configured to account for sparseness of nodes of the collection of nodes.

6. The computer-implemented system of claim 1, further comprising a recovery component configured to facilitate recovery of a token for a failed node.

7. The computer-implemented system of claim 1, wherein the range of the token is separable into two ranges for transfer to other tokens.

8. The computer-implemented system of claim 1, wherein tokens of nodes of the collection of nodes contain a consecutive range of IDs for the nodes of the collection of nodes.

9. The computer-implemented system of claim 1, further comprising a table configured to maintain information for each node, the information including a latest instance identifier of each node of the collection of nodes, and whether the latest instance is known to be failed or not.

10. A computer-implemented method comprising:
    exchanging tokens among networked nodes participating in a federation, the tokens containing ranges of node identification;
    based on the tokens, maintaining information regarding a status of the participating nodes;
    analyzing the information; and
    if the analyzing determines that a range of node identification reported by a node has changed, sending a challenge message to the reporting node requesting information concerning at least one other node covered by the range of the reporting node.

11. The computer-implemented method of claim 10, further comprising determining, based on a reply to the challenge message, whether the at least one other node has failed.

12. The computer-implemented method of claim 10, further comprising maintaining a token version for at least one of the tokens.

13. The computer-implemented method of claim 10, further comprising
defining a one-to-one mapping function from a value domain of node identities to the participating nodes; and
maintaining global knowledge associated with
the one-to-one mapping function, and
a latest instance identifier of each node of the participating nodes, and whether the latest instance is known to be failed or not.

14. The computer-implemented method of claim 10, further comprising receiving from the reporting node, in reply to the challenge message, information regarding nodes known by the reporting node to have failed.

15. The computer-implemented method of claim 10, further comprising updating the information regarding the status of the participating nodes.

16. The computer-implemented method of claim 10, further comprising splitting a current token identification range if a new node joins the federation, by transferring a sub-range of the current token identification range to a token of the new node.

17. The computer-implemented method of claim 10, further comprising merging tokens if a node leaves a ring of the participating nodes.

18. The computer-implemented method of claim 10, further comprising updating an instance ID of a node of the participating nodes.

19. The computer-implemented method of claim 10, further comprising sending a probe message from one routing node of the participating nodes to another routing node of the participating nodes.

20. A computer-readable storage medium storing instructions to, if executed by a computing device, cause the computing device to perform operations comprising:
receiving a routing token from a node of a collection of nodes participating in a networked federation;
inferring, based on a change in a range of identification information in the routing token, that at least one other node in the collection of nodes has failed; and
sending a challenge message to the node sending the routing token, requesting information concerning a neighboring node within a range of identification information corresponding to the node sending the routing token, to verify that the at least one other node has failed.

* * * * *